(12) United States Patent
Ihara et al.

(10) Patent No.: US 9,319,078 B2
(45) Date of Patent: Apr. 19, 2016

(54) WIRELESS COMMUNICATION DEVICE AND SENSING METHOD

(71) Applicant: TOYOTA INFOTECHNOLOGY CENTER CO., LTD., Tokyo (JP)

(72) Inventors: Yutaka Ihara, Saitama (JP); Onur Altintas, Tokyo (JP); Haris Kremo, Tokyo (JP); Hideaki Tanaka, Shiki (JP)

(73) Assignee: TOYOTA INFOTECHNOLOGY CENTER CO., LTD., Tokyo (JP)

( * ) Notice: Subject to any disclaimer, the term of this patent is extended or adjusted under 35 U.S.C. 154(b) by 0 days.

(21) Appl. No.: 14/650,654

(22) PCT Filed: Dec. 9, 2013

(86) PCT No.: PCT/JP2013/082997
§ 371 (c)(1),
(2) Date: Jun. 9, 2015

(87) PCT Pub. No.: WO2014/092055
PCT Pub. Date: Jun. 19, 2014

(65) Prior Publication Data
US 2015/0311925 A1 Oct. 29, 2015

(30) Foreign Application Priority Data

Dec. 12, 2012 (JP) .................................. 2012-271564

(51) Int. Cl.
*H04B 15/02* (2006.01)
*H04B 1/04* (2006.01)
(Continued)

(52) U.S. Cl.
CPC ................ *H04B 1/0475* (2013.01); *H04B 1/10* (2013.01); *H04B 1/54* (2013.01); *H04L 1/0078* (2013.01); *H04L 27/0006* (2013.01); *H04W 16/14* (2013.01); *H04W 88/02* (2013.01)

(58) Field of Classification Search
CPC . H04W 16/14; H04W 72/02; H04W 74/0808; H04L 27/0006; H04L 5/0062; H03J 1/0091; H04K 3/42; H04K 3/43; G01S 7/023; G06K 7/10009; H04B 17/345; G01N 33/0031
See application file for complete search history.

(56) References Cited

U.S. PATENT DOCUMENTS

2008/0166974 A1* 7/2008 Teo .................... H04L 27/0006
455/67.11
2010/0105320 A1 4/2010 Seki
(Continued)

FOREIGN PATENT DOCUMENTS

JP H11-308159 A 11/1999
JP 2010-103719 A 5/2010

OTHER PUBLICATIONS

English version of the abstract and the claims for JP 2010-103719.*
Yamada et al., "A Study on Primary Signal Detection with Known Signal While Receiving a Secondary Signal for Cognitive Radio," IEICE Technical Report, 2008, vol. 108, No. 172, pp. 1-5.
(Continued)

*Primary Examiner* — Tesfaldet Bocure
(74) *Attorney, Agent, or Firm* — Oliff PLC

(57) ABSTRACT

A wireless communication device which includes: a sensing antenna for sensing communication by a primary user; a first transmission antenna; a second transmission antenna; first transmitting unit that generates a transmission signal to be transmitted from the first transmission antenna; second transmitting unit that generates a transmission signal to be transmitted from the second transmission antenna and that cancels, in the sensing antenna, a transmission signal from the first transmission antenna; digital signal processing unit that suppresses the transmission signal from the first transmission antenna, from a received signal of the sensing antenna; and sensing unit that detects communication by a primary user on the basis of the received signal of the sensing antenna that has been processed by the digital signal processing unit. While performing communication as a secondary user, the device detects communication by a primary user. Hence, constant sensing is enabled in a cognitive radio communication device.

11 Claims, 4 Drawing Sheets

(51) Int. Cl.
*H04B 1/10* (2006.01)
*H04B 1/54* (2006.01)
*H04W 16/14* (2009.01)
*H04W 88/02* (2009.01)
*H04L 1/00* (2006.01)
*H04L 27/00* (2006.01)

(56) References Cited

U.S. PATENT DOCUMENTS

| | | | | |
|---|---|---|---|---|
| 2012/0135675 A1* | 5/2012 | Kim | ............ | H04L 27/0006 455/1 |
| 2012/0135780 A1* | 5/2012 | Sun | ............ | H04W 52/241 455/522 |
| 2012/0238220 A1* | 9/2012 | Du | ............ | H04B 17/345 455/67.11 |

OTHER PUBLICATIONS

Cheng et al., "Full Duplex Wireless Communications for Cognitive Radio Networks," arXiv preprint arXiv:1105.0034, Apr. 30, 2011, pp. 3-4, Retrieved from the Internet: <http://arxiv.org/pdf/1105.0034.pdf>.

Choi et al., "Achieving Single Channel, Full Duplex Wireless Communication," Proceedings of the Sixteenth Annual International Conference on Mobile Computing and Networking, MobiCom' 10, ACM, Sep. 20, 2010, p. 3, Retrieved from the Internet: <<http://dl.acm.org/citation.cfm?id=1859997>>.

Feb. 25, 2014 International Search Report issued in International Patent Application No. PCT/JP2013/082997.

Jun. 16, 2015 International Preliminary Report on Patentability issued in International Patent Application No. PCT/JP2013/082997.

* cited by examiner

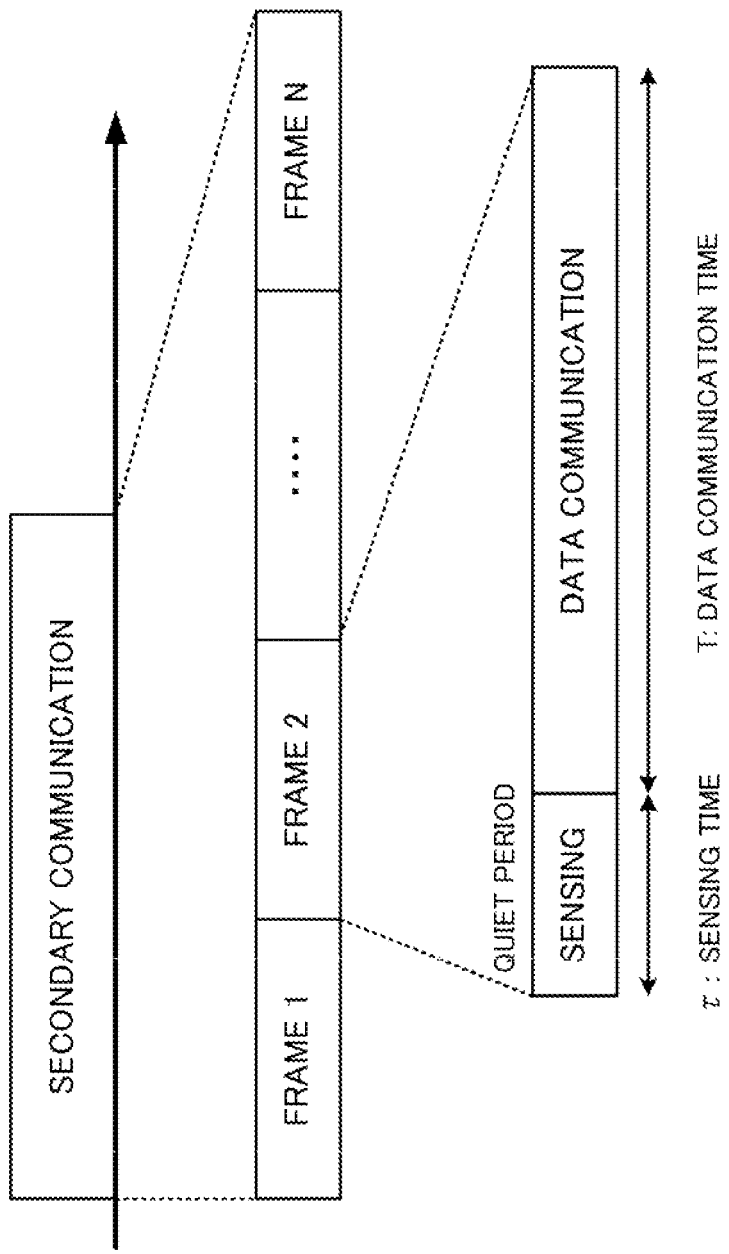

WIRELESS COMMUNICATION DEVICE AND SENSING METHOD

TECHNICAL FIELD

The present invention relates to a wireless communication technology in a cognitive radio system, and more particularly relates to a sensing technology for enabling a secondary user to detect communication by a primary user.

BACKGROUND ART

Active research and development of cognitive radio systems that rely on detection of unused frequencies have been ongoing in recent years. Secondary utilization of frequencies requires that a primary user be not interfered with. To that end, spectrum sensing is performed, such that secondary utilization of a frequency must be discontinued immediately once communication by a primary user is detected.

When implementing cognitive radio in a wireless communication device that moves at high-speed, for instance in an in-vehicle wireless device, the usable frequencies vary, both temporarily and spatially, at any given time. Preferably, therefore, sensing is performed constantly, in order to protect the primary user reliably.

In a case where communication by a secondary user is being performed, a problem arises in that communication by the primary user cannot be detected on account of the near-far problem. Therefore, a method has been proposed that involves providing quiet periods (QP) at which none of the secondary users communicates, as illustrated in FIG. 4, such that sensing is performed in those periods. Such a method is problematic in that the appearance of a primary user can only be detected in the quiet periods, and also problematic in that communication throughput as a secondary user drops due to presence of the quiet periods.

Methods have also been proposed in which communication as a secondary user and detection of a primary user are performed simultaneously. In Non-patent literature 1, part of a signal of a primary user is held as known information, and secondary utilization is discontinued upon reception of the known information in a primary signal, during communication by a secondary user. In this method, the primary signal must be known beforehand as known information, and hence the method is problematic in that, as a result, the scope of application of the method is limited. Further, the method does not address elimination of the near-far problem derived from transmission signals from an own node in a sensing antenna.

CITATION LIST

Non Patent Literature

NPL 1: Yamada Takayuki et al., "A study on a primary signal detection with known signal while receiving a secondary signal for cognitive radio", IEICE technical report SR2008-18, pp. 1-5 (July 2008).

SUMMARY OF INVENTION

Technical Problem

It is an object of the present invention to provide a sensing technology that allows detecting communication by a primary user while performing communication as a secondary user.

Solution to Problem

In order to attain the above goal, a self-signal suppression process is performed, in the present invention, in two domains, i.e. the analog domain and the digital domain. As a suppression scheme in the analog domain, specifically, an anti-phase signal is transmitted that cancels a self-signal. Further, digital signal processing is resorted to as suppression in the digital domain. By combining these suppression processes, it becomes possible to detect communication by a primary user while during communication as a secondary user.

More specifically, the wireless communication device of the present invention comprises: a sensing antenna for sensing communication by a primary user; a first transmission antenna; a second transmission antenna; first transmitting unit that generates a transmission signal to be transmitted from the first transmission antenna; second transmitting unit that generates a transmission signal to be transmitted from the second transmission antenna, and that cancels, in the sensing antenna, a transmission signal from the first transmission antenna; digital signal processing unit that suppresses the transmission signal from the first transmission antenna, from a received signal of the sensing antenna; and sensing unit that detects communication by a primary user, on the basis of the received signal of the sensing antenna that has been processed by the digital signal processing unit.

Although the influence of a self-signal cannot be completely eliminated just as a result of the suppression process, in the analog domain, by a cancel signal that is transmitted from the second antenna, it is nevertheless possible to suppress the self-signal at least to such a degree that the problem of dynamic range in the sensing antenna can be eliminated. Further, communication by the primary user can be detected by performing self-signal suppression process by digital signal processing. Therefore, it becomes possible to simultaneously sense the primary user, using the sensing antenna, while performing wireless communication using the first transmission antenna. Sensing is enabled while communication is in progress, and, therefore, constant sensing can be performed without incurring drops in communication throughput.

In the present invention, preferably, the distance between the first transmission antenna and the sensing antenna is set to be greater than the distance between the second transmission antenna and the sensing antenna. Preferably, the first transmission antenna and the sensing antenna are disposed according to a positional relationship such that communication between the two antennas is non-line-of-sight communication. Preferably, the second transmission antenna is imparted with directivity towards the sensing antenna.

By increasing the distance between the first transmission antenna and the sensing antenna, and by setting a non-line-of-sight communication, it becomes possible to reduce the self-signal that arrives at the sensing antenna, due to the influence of inter-antenna distance attenuation. The second transmission antenna is close to the sensing antenna, and hence there can be reduced the transmission intensity of a wireless signal for self-signal cancelling. As a result, it becomes possible to reduce the influence on the directivity of the signal transmitted from the first transmission antenna, and to suppress adverse effects on communication as a secondary user. Adverse effects on the directivity of the first transmission antenna can be further reduced by imparting directivity to the second transmission antenna.

Preferably, the digital signal processing unit of the present invention suppresses the transmission signal from the first transmission antenna by minimum mean square error estimation in which a recursive least squares algorithm is used. The amount of computation is reduced as a result, and hence real-time sensing is enabled even in a wireless communication device that is equipped with only few computational resources.

The present invention can also be regarded as a wireless communication device having at least some of the above means. The present invention can also be regarded as a wireless communication method or sensing method comprising at least some of the above processes, and as a computer program for executing the above methods in a computer. The present invention can be configured by mutually combining, as far as possible, the above means and processes.

Advantageous Effects of Invention

The present invention allows detecting communication by a primary user while performing communication as a secondary user.

BRIEF DESCRIPTION OF DRAWINGS

FIG. 4 is a diagram for explaining a sensing method according to conventional art.

DESCRIPTION OF EMBODIMENTS

Preferred embodiments of the present invention will be exemplarily explained next in detail with reference to accompanying drawings.
<Overview>

A system according to an embodiment of the present invention is a cognitive radio communication system for performing communication using a frequency not being utilized by a user (primary user) that has obtained a frequency utilization license, from among frequencies allocated to that primary user. Frequencies having been allocated to the primary user but not being used in practice are referred to as white space. In the present embodiment, the frequency utilization efficiency is enhanced by performing communication using such white space.

In the present description, communication by the primary user and communication by the secondary user will be referred to as primary communication and secondary communication, respectively. Wireless signals in primary communication and secondary communication will be referred to as primary signals and secondary signals, respectively.

A node (wireless communication device) that constitutes the cognitive radio system of the present embodiment is a movable wireless communication device. In the present embodiment, in particular, a cognitive radio system will be explained that is made up of a wireless communication device installed in a vehicle. To simplify the explanation below, no distinction will be made between an onboard (in-vehicle) communication device and a vehicle, and for instance the feature whereby onboard communication devices communicate with each other will be described as vehicles communicating with each other.

In the present embodiment, the onboard communication device performs sensing of detecting communication by a primary user, at the same time that the onboard communication device, as a secondary user, performs wireless communication using the white space. As a result, interference with the primary user is avoided through immediate discontinuation of communication as a secondary user when the primary user initiates communication.

Figure 1:
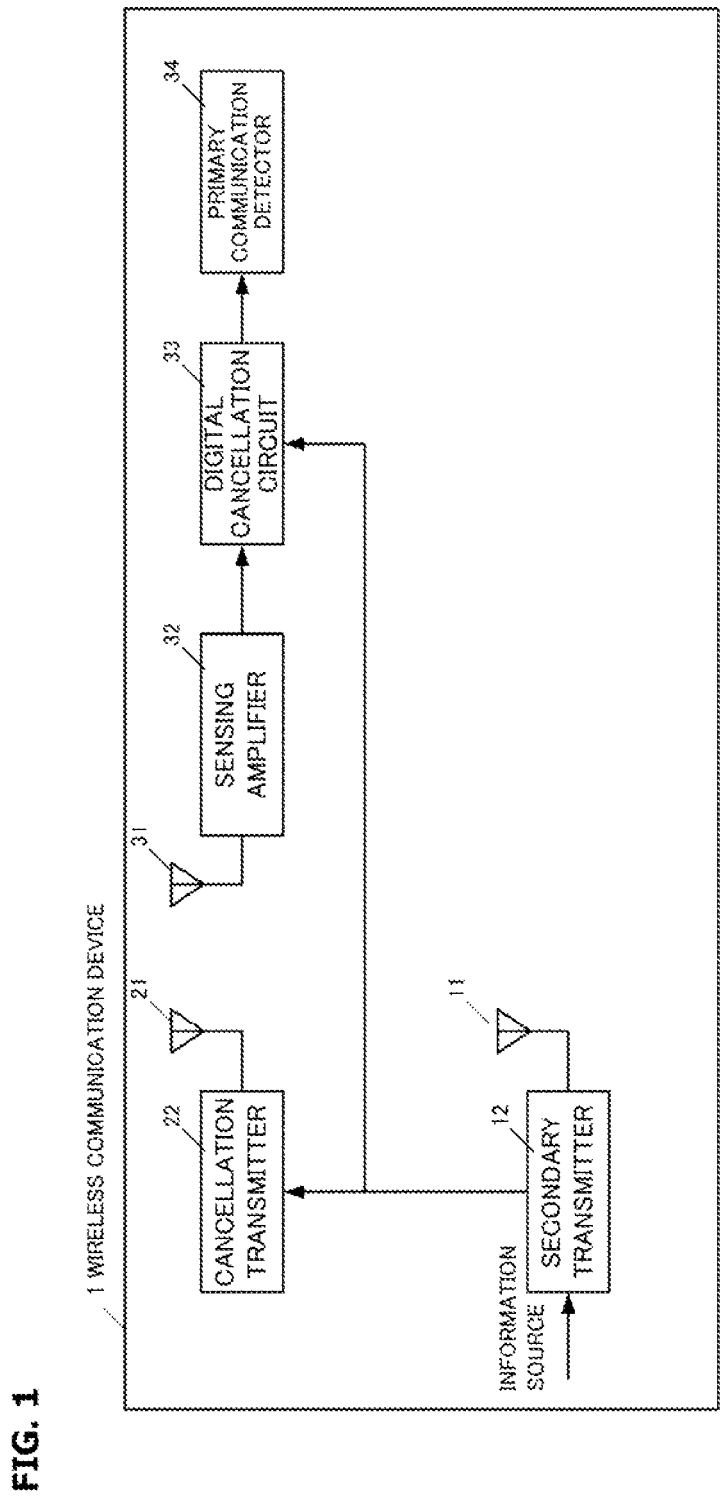
FIG. 1 is a diagram illustrating the configuration of a wireless communication device according to the embodiment.

As illustrated in FIG. 1, the wireless communication device of the present embodiment performs communication using three antennas 11, 21, 31. A secondary communication antenna 11 is an antenna for secondary communication, and a sensing antenna 31 is an antenna for detecting primary communication. That is, secondary communication is performed using the secondary communication antenna 11, and primary communication is detected using the sensing antenna 31. The purpose of this is to discontinue the utilization of a white space frequency, so as not to interfere with a primary user, in a case where a primary user appears in the midst of communication in which the white space is utilized.

A signal, which is a superposition of a transmission signal of secondary communication and a primary transmission signal, arrives at the sensing antenna 31 in a case where the wireless communication device is performing secondary communication. The sensing antenna 31 is disposed closer to the secondary communication antenna 11 than the primary user, and, accordingly, the power component of the secondary signal in the signal received at the sensing antenna 31 is very large. In a case where the received signal is amplified, the primary signal may fail to be identified, due to the occurrence of a signal amplification plateau caused by saturation phenomena. In particular, a hardware-reliant receiver having not that high a performance cannot identify the primary signal.

The power component of the self-signal in the sensing antenna 31 can be expected to be reduced, through the influence of distance attenuation, by setting the distance between the secondary communication antenna 11 and the sensing antenna 31 to be of several meters. In ordinary automobiles, this distance between antennas can be set to range from about 2 meters to about 5 meters. The distance between antennas may be increased in the case of larger vehicles. The influence of the self-signal can be further suppressed if the two antennas are disposed according to a positional relationship such that communication between the antennas is non-line-of-sight communication.

However, eliminating the influence of the self-signal by relying only on distance attenuation between antennas is practically impossible. A process is therefore carried out, for mitigating the influence of a self-signal, in two domains, i.e. the analog domain and the digital domain. This enables as a result detection of the primary user, unaffected by the self-signal, even in the midst of secondary communication.

Figure 2:
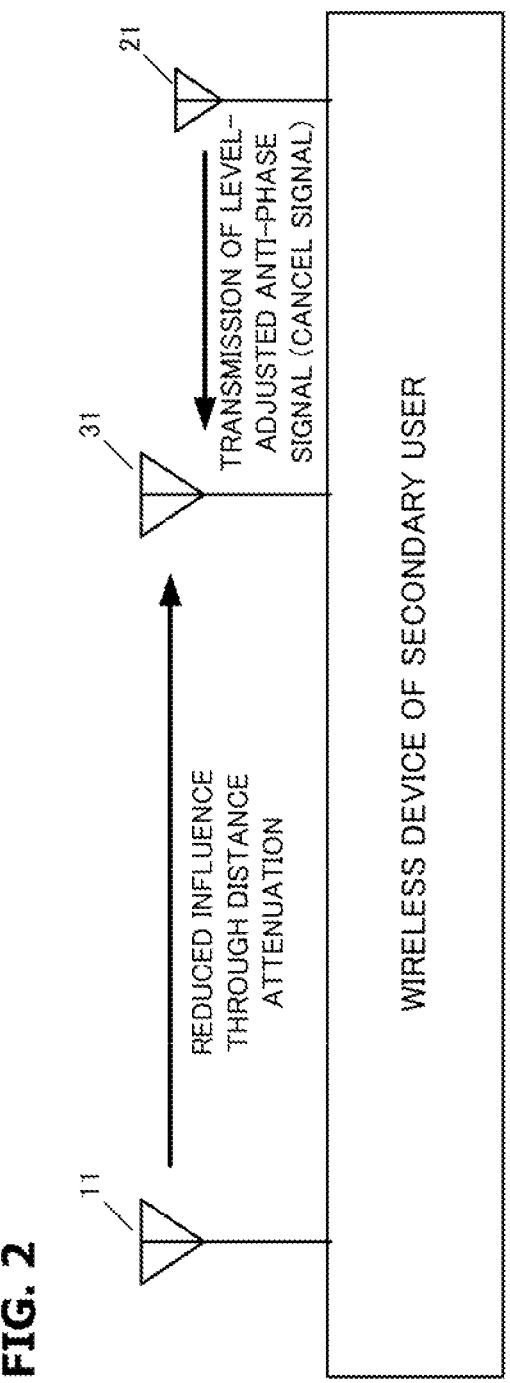
FIG. 2 is a diagram for explaining a suppression process of a secondary signal in which a cancellation signal is used.

As a self-signal suppression process in the analog domain there is provided a cancellation antenna 21, as illustrated in FIG. 2, that transmits from the cancellation antenna 21a cancellation signal such that the self-signal is cancelled at the point of installation of the sensing antenna 31. The cancellation signal is a signal of amplitude identical to, but phase opposite to, those of the signal that is transmitted from the secondary communication antenna 11, and the point of installation of the sensing antenna 31. This way, it becomes possible to mitigate the influence of a self-signal in the sensing antenna 31.

Preferably, the distance between the cancellation antenna 21 and the sensing antenna 31 is set to be smaller than the distance between the secondary communication antenna 11 and the sensing antenna 31. For instance, the distance between the cancellation antenna 21 and the sensing antenna 31 can be set to range from several centimeters to several tens of centimeters. As a result, it becomes possible to reduce the transmission intensity of the cancellation signal that is transmitted from the cancellation antenna 21, without significantly compromising the directivity of the secondary transmission signal that is transmitted from the secondary communication antenna 11.

Preferably, the cancellation antenna 21 is imparted with directivity in the direction of the sensing antenna 31. As a result, it becomes possible to further reduce adverse effects on the directivity of the secondary transmission signal.

It is difficult to eliminate completely the influence of the self-signal using the cancellation signal. Therefore, digital signal processing is performed on the signal received through the sensing antenna 31, to further suppress thereby the influence of the self-signal. Specifically, the self-signal is suppressed, from a superimposed signal, through estimation of the self-signal by minimum mean square error (MMSE) estimation. In this case, the self-signal can be suppressed in real-time, through recursive processing, by resorting to a recursive least squares (RLS) algorithm, on the basis of past stored information.

The primary user can be detected on the basis of the signal received through the sensing antenna 31, even in the midst of secondary communication, by performing thus the self-signal suppression process in two domains, i.e. the analog domain and the digital domain.

<Device Configuration>

FIG. 1 is a diagram illustrating the configuration of a wireless communication device 1 of the present embodiment. The wireless communication device 1 comprises the secondary communication antenna 11, a secondary transmitter 12, the cancellation antenna 21, a cancellation transmitter 22, the sensing antenna 31, a sensing amplifier 32, a digital cancellation circuit 33 and a primary communication detector 34. The secondary communication antenna 11 corresponds to a first transmission antenna, the secondary transmitter 12 to a first transmitting unit, the cancellation antenna 21 to a second transmission antenna, the cancellation transmitter 22 to a second transmitting unit, the sensing antenna 31 to a sensing antenna, the digital cancellation circuit 33 to a digital signal processing unit and the primary communication detector 34 to a sensing unit.

The secondary communication antenna 11 is an antenna for performing secondary communication. Wireless signals for secondary communication are transmitted from the wireless communication device 1, while wireless signals for secondary communication are received from another wireless communication device, using the secondary communication antenna 11. Preferably, the secondary communication antenna 11 is disposed at a comparatively large distance from the sensing antenna 31, for instance a distance of about 2 meters. Preferably, the antennas are disposed in such a manner that communication between the secondary communication antenna 11 and the sensing antenna 31 is non-line-of-sight communication.

The secondary transmitter 12 is a functional unit that generates, on the basis of information inputted from an information source, a transmission signal for secondary communication that is transmitted from the secondary communication antenna 11. The secondary transmitter 12 outputs the transmission signal having been generated on the basis of the information inputted from the information source, also to the cancellation transmitter 22 and the digital cancellation circuit 33. Although the focus herein is laid only on transmission, in fact transmission-reception functionality is required in order for transmission and reception to be performed via the secondary communication antenna 11.

The cancellation antenna 21 is an antenna for transmitting a signal (cancellation signal) such that the signal transmitted from the secondary communication antenna 11 is cancelled at the sensing antenna 31. Preferably, the cancellation antenna 21 is disposed at a short distance from the sensing antenna 31, for instance about 10 centimeters. Preferably, the cancellation antenna 21 is set to have directivity towards the sensing antenna 31.

The cancellation transmitter 22 is a functional unit that generates, a cancellation signal that is transmitted from the cancellation antenna 21, on the basis of the transmission signal for secondary communication generated by the secondary transmitter 12. The cancellation signal is a wireless signal such that the secondary signal that is transmitted from the secondary communication antenna 11 is canceled at the point of installation of the sensing antenna 31. The cancellation transmitter 22 can generate the cancellation signal on the basis of the transmission signal obtained from the secondary transmitter 12, since the positional relationship between the three antennas is known. Preferably, the cancellation signal is generated on the basis of a signal obtained from the sensing antenna 31, in order to enhance cancellation precision.

The sensing antenna 31 is an antenna for detecting communication by the primary user. The sensing amplifier 32 is a functional unit that amplifies a wireless signal received by the sensing antenna 31. The digital cancellation circuit 33 (digital signal processing unit) performs a process of estimating the self-signal, and suppressing the self-signal from the signal received through the sensing antenna 31. Although the signal of secondary communication (self-signal) in the sensing antenna 31 is reduced by using the cancellation signal, the influence of the self-signal is difficult to eliminate completely. Therefore, the transmission signal from the secondary transmitter 12 is acquired, the self-signal is worked out by performing channel estimation between the secondary communication antenna 11 and the sensing antenna 13, and the self-signal is removed from the received signal of the sensing antenna 31.

Figure 3:
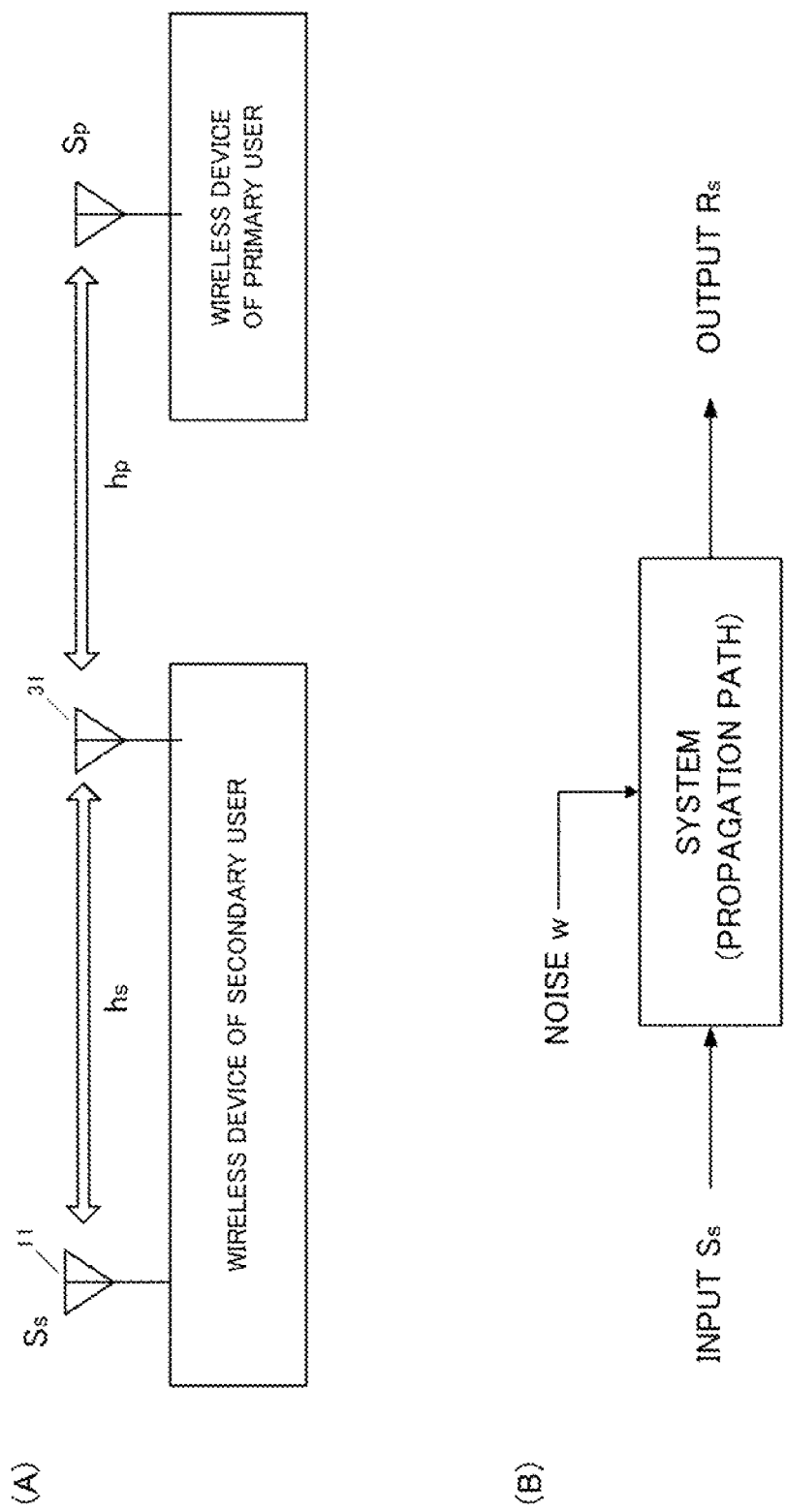
FIG. 3 is a diagram for explaining a suppression process of a secondary signal by channel estimation.

As illustrated in FIG. 3(A), a superimposed signal r that arrives at the sensing antenna 31 is described as follows.

$$r = r_s + r_p + w \qquad \text{[Math. 1]}$$
$$= h_s S_s + h_p S_p + w$$

Herein, $r_s$ is a secondary incoming signal (after cancellation), $r_p$ is a primary incoming signal, $S_s$ is a secondary transmission signal, $S_p$ is a primary transmission signal, $h_s$ is a channel coefficient between the sensing antenna 31 and the secondary communication antenna 11, $h_p$ is a channel coefficient between the sensing antenna 31 and the primary user, and w is noise.

The primary incoming signal $r_p$ must be detected accurately in order to sense primary communication. The secondary incoming signal $r_s$, which is an unwanted component, must be removed in order to emphasize the primary incoming signal. To that end, a signal ($\doteq h_s S_s$) that simulates a signal having passed through the channel is generated, in the digital cancellation circuit 33, on the basis of the secondary transmission signal, and is subtracted from the received signal.

Modeling according to a linear system, such as the one illustrated in FIG. 3(B), is resorted to herein in order to estimate the secondary transmission signal. Herein, the input $S_s$ is a secondary signal, and the output $R_s$ is a sensing received signal, the propagation path is the free space between the secondary communication antenna 11 and the sensing antenna 31, and the noise is signal attenuation and/or fading variation.

Rewritten according to the MMSE model, the input-output relationship is as follows.

$$R_{s,t} = z^T \theta_t + w_t$$

$$z_t^T = [-R_{s,t-1}, \ldots, -R_{s,t-n}, S_{s,t-1}, \ldots, S_{s,t-n}]$$

$$\theta_t = [a_1, \ldots, a_n, b_1, \ldots, b_n] \quad \text{[Math. 2]}$$

Herein, $z_t$ is sensing information and self-signal information in a state where no primary communication exists, such that past information of the sensing information and self-signal information is held in the digital cancellation circuit 33.

To estimate the system parameters, it is necessary to design a weight coefficient $\theta$ in such a manner that the difference between the current state and a state estimated from the past is minimal. At that rate, however, such design involves an enormous amount of computation, and is accordingly not suitable for real-time processing.

Therefore, a recursive least squares algorithm is resorted to, so that it becomes possible as a result to estimate the self-signal (secondary incoming signal) that arrives at the sensing antenna 31 on the basis of the recursively computable expressions below. Herein, $\rho$ is a forgetting factor.

$$R_{s,N+1} = h'_{s,N+1} S_{s,N+1} = z_N^T \hat{\theta}_N \quad \text{[Math. 3]}$$

$$\hat{\theta}_N = \hat{\theta}_{N-1} + L_N \varepsilon_n$$

$$\varepsilon_N = R_{s,N} - z_N^T \hat{\theta}_{N-1}$$

$$L_N = \frac{P_{N-1} z_N}{\rho_N + z_N^T P_{N-z} z_N}$$

$$P_N = \frac{1}{\rho_N}\left[P_{N-1} - \frac{P_{N-1} z_N z_N^T P_{N-1}}{\rho_N + z_N^T P_{N-1} z_N}\right]$$

The secondary communication signal that arrives at the sensing antenna 31 can be estimated thus, and hence the influence of the self-signal can be suppressed through removal of the signal having been estimated from a signal received at the sensing antenna 31. As a result, only the primary signal (if present) and noise are comprised in the signal that is outputted by the digital cancellation circuit 33.

The primary communication detector 34 (sensing unit) is a functional unit that detects the presence or absence of a primary signal on the basis of the signal outputted by the digital cancellation circuit 33. For instance, an energy detection method can be resorted to herein as the detection algorithm. Primary communication can also be detected in accordance with, for instance, a matched filter method or feature method, in cases where the primary communication is known.

In the present embodiment, secondary communication from the secondary communication antenna 11 is carried out constantly, without quiet periods being particularly provided. Primary communication can be detected as a result of the self-signal suppression process, even if secondary communication is being performed constantly. In the present embodiment, therefore, secondary communication and primary detection are performed simultaneously and constantly. Upon detection of primary communication, the secondary transmitter 12 discontinues immediately wireless communication in which the current frequency is used.

Workings and Effect of the Present Embodiment

In the present embodiment, two self-signal suppression processes, in the analog domain and the digital domain, are combined so that, as a result, it becomes possible to remove, substantially completely, the influence of a self-signal in the sensing antenna. Therefore, primary communication can be detected using the sensing antenna 31, also in cases where a secondary signal is being transmitted from the secondary communication antenna 11. Specifically, primary communication can be detected without providing quiet periods for primary communication detection, such as the one illustrated in the related art of FIG. 4. Drops in the throughput of the secondary communication can be therefore suppressed. Further, primary detection can be carried out constantly, and hence the primary user can be detected immediately.

<Variations>

In the explanation of the above embodiment, an example has been described of a cognitive radio system that is made up of a wireless communication device installed in a vehicle. However, the present invention can be configured in the form of any movable wireless communication device other than an automotive wireless communication device. The term movable wireless communication device applies herein, for instance, to a wireless communication device with which a vehicle, aircraft of vessel is equipped, to a wireless communication device that is brought into a vehicle, aircraft or vessel and that moves accompanying the motion of the foregoing, and to a personal portable wireless communication device.

In the explanation of the embodiments above, the digital cancellation circuit 33 and the primary communication detector 34 are envisaged to be realized in the form of dedicated hardware circuits (integrated circuits), such as an ASIC or the like. However, the functional units above may be realized as software, by combining a program with a CPU (Central Processing Unit), MPU (Micro Processing Unit) or FGPA (Field-Programmable Gate Array). The functional units may also be realized in the form of combinations of both hardware and software.

REFERENCE SIGNS LIST 11 secondary communication antenna
12 secondary transmitter
21 cancellation antenna
22 cancellation transmitter
31 sensing antenna
33 digital cancellation circuit
34 primary communication detector

The invention claimed is:
1. A wireless communication device, comprising:
a sensing antenna for sensing communication by a primary user;
a first transmission antenna;
a second transmission antenna;
a first transmitting unit that generates a transmission signal to be transmitted from the first transmission antenna;
a second transmitting unit that generates a transmission signal to be transmitted from the second transmission antenna and that cancels, in the sensing antenna, a transmission signal from the first transmission antenna;
a digital signal processing unit that suppresses the transmission signal from the first transmission antenna, from a received signal of the sensing antenna; and a sensing unit that detects communication by the primary user on the basis of the received signal of the sensing antenna that has been processed by the digital signal processing unit, wherein the digital signal processing unit supresses the transmission signal from the first transmission antenna by minimum mean square error estimation in which a recursive least squares algorithm is used.

2. The wireless communication device according to claim 1, wherein transmission implemented in use of the first transmission antenna and sensing implemented in use of the sensing antenna are performed simultaneously.

3. The wireless communication device according to claim 1, wherein a distance between the first transmission antenna and the sensing antenna is greater than a distance between the second transmission antenna and the sensing antenna.

4. The wireless communication device according to claim 1, wherein the first transmission antenna and the sensing antenna are disposed according to a positional relationship in which communication between these two antennas is non-line-of-sight communication.

5. The wireless communication device according to claim 2, wherein a distance between the first transmission antenna and the sensing antenna is greater than a distance between the second transmission antenna and the sensing antenna.

6. The wireless communication device according to claim 5, wherein the first transmission antenna and the sensing antenna are disposed according to a positional relationship in which communication between these two antennas is non-line-of-sight communication.

7. The wireless communication device according to claim 2, wherein the first transmission antenna and the sensing antenna are disposed according to a positional relationship in which communication between these two antennas is non-line-of-sight communication.

8. The wireless communication device according to claim 3, wherein the first transmission antenna and the sensing antenna are disposed according to a positional relationship in which communication between these two antennas is non-line-of-sight communication.

9. A sensing method in a wireless communication device for detecting communication by a primary user while performing wireless communication as a secondary user, the method comprising:

a step of receiving a wireless signal using a sensing antenna;

a step of transmitting a transmission signal from a first transmission antenna;

a step of transmitting, from a second transmission antenna, a signal that cancels, in the sensing antenna, the transmission signal from the first transmission antenna;

a step of suppressing the transmission signal from the first transmission antenna, from a received signal of the sensing antenna; and a step of detecting communication by the primary user on the basis of the received signal, from which the transmission signal from the first transmission antenna has been suppressed, wherein in the step of suppressing the tranmission signal from the first transmission antenna, from a received signal of the sensing antenna, the transmission signal from the first transmission antenna is suppressed by minimum mean square error estimnation in which a recursive least squares algorithm is used.

10. The sensing method according to claim 9, wherein transmission implemented in use of the first transmission antenna and sensing implemented in use of the sensing antenna are performed simultaneously.

11. A wireless communication device, comprising:

a sensing antenna for sensing communication by a primary user;

a first transmission antenna;

a second transmission antenna;

a first transmitting unit that generates a transmission signal to be transmitted from the first transmission antenna;

a second transmitting unit that generates a transmission signal to be transmitted from the second transmission antenna and that cancels, in the sensing antenna, a transmission signal from the first transmission antenna;

a digital signal processing unit that suppresses the transmission signal from the first transmission antenna, from a received signal of the sensing antenna; and a sensing unit that detects communication by the primary user on the basis of the received signal of the sensing antenna that has been processed by the digital signal processing unit, wherein the first transmission antenna and the sensing antenna are disposed according to a positional relationship in which communication between these two antennas is non-line-of-sight communication.

* * * * *